United States Patent
Suzuki et al.

(10) Patent No.: US 7,911,216 B2
(45) Date of Patent: Mar. 22, 2011

(54) SEMICONDUCTOR INTEGRATED CIRCUIT, DEBUG/TRACE CIRCUIT AND SEMICONDUCTOR INTEGRATED CIRCUIT OPERATION OBSERVING METHOD

(75) Inventors: Noriaki Suzuki, Tokyo (JP); Sunao Torii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/525,953

(22) PCT Filed: Jan. 25, 2008

(86) PCT No.: PCT/JP2008/051078
§ 371 (c)(1),
(2), (4) Date: Aug. 5, 2009

(87) PCT Pub. No.: WO2008/099657
PCT Pub. Date: Aug. 21, 2008

(65) Prior Publication Data
US 2010/0321051 A1    Dec. 23, 2010

(30) Foreign Application Priority Data
Feb. 14, 2007   (JP) ................................ 2007-033340

(51) Int. Cl.
*G01R 31/3187* (2006.01)
(52) U.S. Cl. ...................................... 324/750.3; 717/124
(58) Field of Classification Search .......................... None
See application file for complete search history.

(56) References Cited

U.S. PATENT DOCUMENTS

| 2002/0087918 A1* | 7/2002 | Miura et al. ..................... 714/38 |
| 2009/0106609 A1* | 4/2009 | Sato ............................. 714/726 |

FOREIGN PATENT DOCUMENTS

| JP | 1-288931 A | 11/1989 |
| JP | 5-100891 A | 4/1993 |
| JP | 2001147836 A | 5/2001 |
| JP | 2002024201 A | 1/2002 |
| JP | 2003263340 A | 9/2003 |
| JP | 2006012017 A | 1/2006 |
| JP | 2006336305 A | 12/2006 |

OTHER PUBLICATIONS

International Search Report for PCT/JP2008/051078 mailed Feb. 26, 2008.

* cited by examiner

*Primary Examiner* — Ha Tran T Nguyen
*Assistant Examiner* — Arleen M Vazquez

(57) ABSTRACT

A main functional structure executes continuous predetermined operations to continuously generate events associated with the operations. A debug/trace circuit compares an event occurring at the main functional structure with detection condition indicating information of one entry in a control information list, and executes the operation designated by operation indicating information paired with the detection condition indicating information in accordance with the result of the comparison. The debug/trace circuit continuously performs this in accordance with the control information list to identify the event.

11 Claims, 10 Drawing Sheets

SEMICONDUCTOR INTEGRATED CIRCUIT, DEBUG/TRACE CIRCUIT AND SEMICONDUCTOR INTEGRATED CIRCUIT OPERATION OBSERVING METHOD

This application is the National Phase of PCT/JP2008/051078, filed Jan. 25, 2008, which claims priority based on Japanese Patent Application 2007-033340 filed on Feb. 14, 2007, and should incorporate all the disclosure thereof herein.

TECHNICAL FIELD

The present invention relates to operation tracing in a semiconductor integrated circuit.

BACKGROUND ART

With the recent increased complexity of built-in devices, establishment of a technique for performing efficient debugging at the stage of development has been demanded. For debugging most built-in devices, a method of setting up a break point using an incircuit emulator (ICE), a method of executing steps, and others have been used. However, there are many cases in which these methods cannot be used because it is impossible to adapt the operation timing with the timing of the surrounding circuit when the system is required to have real-time properties.

Under such circumstances, an importance of the observation of the status change and the behavior by tracing the operation inside the device has being increased.

On the other hand, in order to reduce production cost of built-in devices, there are often the cases where they do not have much margin as to internal memory capacity and CPU performance. Therefore, the method of storing an operation log by software processing, which is used by usual computer equipment typified by servers and personal computers, cannot be satisfactorily used by a built-in device. Further, in built-in devices, a customized system LSI is often used, so that it is often important to make observation on the behavior of the bus, the behavior of the peripheral circuits and the like, which cannot be observed by software processing alone.

For this reason, usually a technique for extracting signals for checking the operational status of a system LSI through monitoring terminals is provided, and it is an effective method is to store the change of the operational status as traced data by using the monitoring terminals and to analyze it. A technology using this technique is disclosed in Japanese Patent Application Laid-open 2002-24201 (which will be referred to hereinbelow as "Document 1").

FIG. 1 is a block diagram showing an internal configuration of a system LSI described in Document 1. The system LSI in FIG. 1 includes MPU core (control circuit) 91, built-in RAM (Random Access Memory, storage circuit) 92 that stores the program for operating MPU core 91, peripheral circuit 93 for performing transmission and reception of signals with MPU core 91. The system LSI is also connected to system LSI peripheral apparatus 5, so that the two transmit and receive signals to and from each other. Built-in RAM 92 also incorporates a debug supporting function program in addition to other than the program for operating MPU core 91.

Further, debug supporting circuit 914 incorporating signal selection circuit 931 is provided inside MPU core 91. Peripheral circuit 93 incorporates signal selection circuit 932. In addition, signal selection circuit 933 for selecting a final monitor signal is provided. The selecting operation of each of signal selection circuits 931 to 933 is controlled by monitor signal control circuit 4.

The system LSI in Document 1 includes signal selection circuit 931 for selecting any one of the internal signals in MPU core 91, signal selection circuit 932 for selecting any one of the internal signals in peripheral circuit 93 and signal selection circuit 933 for selecting either one of the outputs from these signal selection circuits 931 and 932, and the system LSI can arbitrarily switch the selecting operation of each of signal selection circuits 931 to 933 as required. Accordingly, it is possible to analyze in detail the internal operation of the system LSI in real-time. Further, even if the monitoring terminals are limited, it is possible to easily switch and output a plurality of monitoring signals.

DISCLOSURE OF INVENTION

However, the tracing system disclosed in Document 1 has some problems.

The tracing system disclosed in Document 1 operates on the premise that trace data is output to the outside of the LSI, so that the amount of observable trace data per unit time is limited by the speed of the communication line to the outside, the built-in buffer capacity and the like. Accordingly, there occurs a case in which a desired operation cannot be checked in a system or the like that internal operation speed is high.

Further, since, in the tracing system disclosed in Document 1, the signals to be observed are limited to those selected so as to reduce the amount of trace data, it is impossible to make a decision in a particular condition based on behaviors of all the signals to be observed.

One object of the present invention is to provide a means for enabling observation of a desired operation while observing arbitrary signals to be observed, without being affected by the speed of the connected communication line and by the built-in buffer capacity.

In order to attain the above object, a semiconductor integrated circuit according to one embodiment mode of the present invention is a semiconductor integrated circuit having a debugging function, and includes:

a main functional structure that executes continuous predetermined operations to continuously generate events associated with said operations; and a debug/trace circuit, which stores beforehand a control information list including a plurality of entries in a sequential manner so as to identify an event which needs an observation based on a series of events, each entry consisting of a set of detection condition indicating information to detect generation of a target event and operation indicating information to designate an operation in accordance with the result of comparison between said detection condition indicating information and the event occurring at said main functional structure, and which continuously performs in accordance with said control information list, comparison of an event occurring at said main functional structure with the detection condition indicating information of one entry in said control information list, and execution of the operation designated by said operation indicating information paired with said detection condition indicating information in accordance with the result of said comparison, to identify said event.

A debug/trace circuit of the present invention is a debug/trace circuit built in a semiconductor integrated circuit including a main functional structure that executes continuous predetermined operations to continuously generate events associated with said operations, and includes:

a control information list holder which stores beforehand a control information list including a plurality of entries in a sequential manner so as to identify an event needing observation based on a series of events, each entry consisting of a set of detection condition indicating information to detect generation of a target event and operation indicating information to designate an operation in accordance with the result of comparison between said detection condition indicating information and the event occurring at said main functional structure;

an event detector which continuously performs in accordance with said control information list, comparison of an event occurring at said main functional structure with the detection condition indicating information of one entry in said control information list; and, a controller which, in accordance with the result of said comparison from said event detector, executes the operation designated by said operation indicating information that is paired with said detection condition indicating information.

An operation observing method for a semiconductor integrated circuit of the present invention is an operation observing method for a semiconductor integrated circuit to observe the operation of a main functional structure by a debug/trace circuit built in a semiconductor integrated circuit including a main functional structure that executes continuous predetermined operations to continuously generate events associated with said operations, and includes the steps of:

storing beforehand a control information list including a plurality of entries in a sequential manner so as to identify an event needing observation based on a series of events, each entry consisting of a set of detection condition indicating information to detect generation of a target event and operation indicating information to designate an operation in accordance with the result of comparison between said detection condition indicating information and the event occurring at said main functional structure; and, continuously performing in accordance with said control information list, comparison of an event occurring at said main functional structure with the detection condition indicating information of one entry in said control information list, and execution of the operation designated by said operation indicating information that is paired with said detection condition indicating information in accordance with the result of said comparison, to identify and observe said event.

BEST MODE FOR CARRYING OUT THE INVENTION

The exemplary embodiments of the present invention will be described in detail with reference to the drawings.

First Exemplary Embodiment

Figure 1:
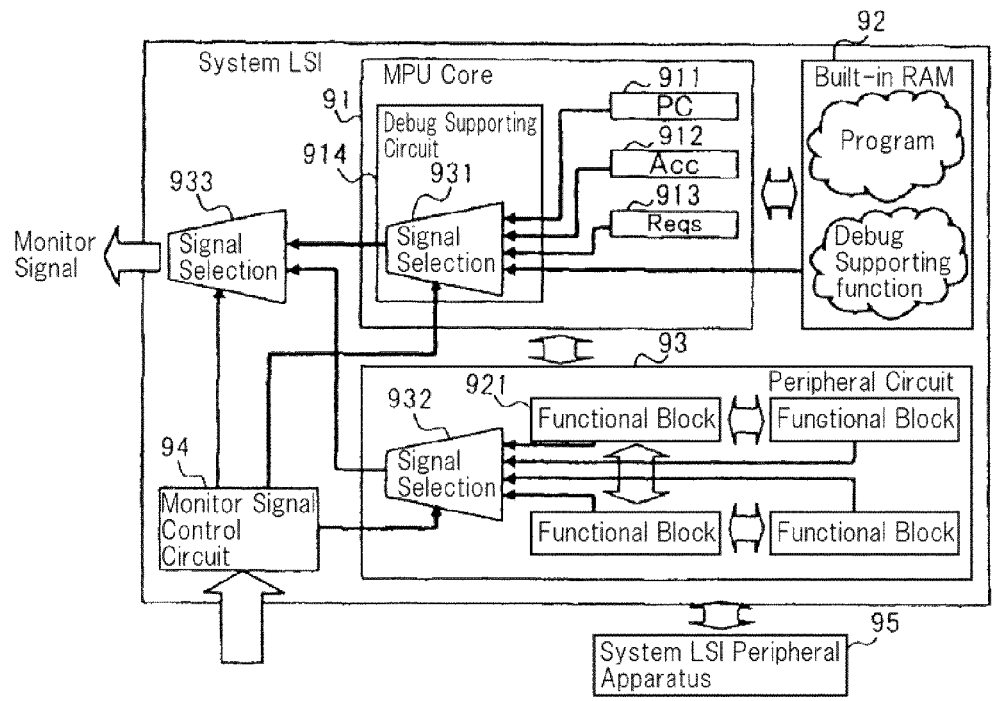
[FIG. 1] is a block diagram showing the configuration of a tracing system disclosed in Document 1.
Figure 2:
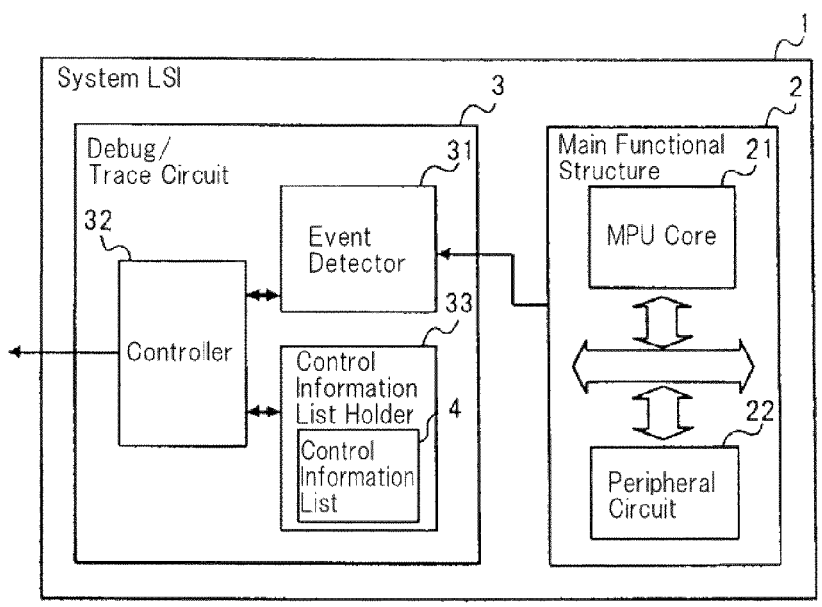
[FIG. 2] is a block diagram showing a configuration of the first exemplary embodiment.

FIG. 2 is a block diagram showing an overall configuration of a debug/trace system according to the first exemplary embodiment of the present invention. Referring to FIG. 2, system LSI 1 includes main functional structure 2 and debug/trace circuit 3. The system LSIs mentioned herein may include configurations having a plurality of chips integrated therein, such as SiP (System in Package), MCP (Multi Chip Module), PoP (Package on Package) and the like. It is also assumed that the system LSI has a typical configuration in which the capacity of communication inside the system LSI is high enough compared to the capacity of communication to the outside of the LSI. Main functional structure 2 is a circuit for realizing essential desired functions of system LSI 1, and is made up of MPU core 21 and peripheral circuit 22 as a typical example. Debug/trace circuit 3 includes event detector 31, controller 32 and control information list holder 33. Control information list holder 33 holds control information list 4.

Figure 3:
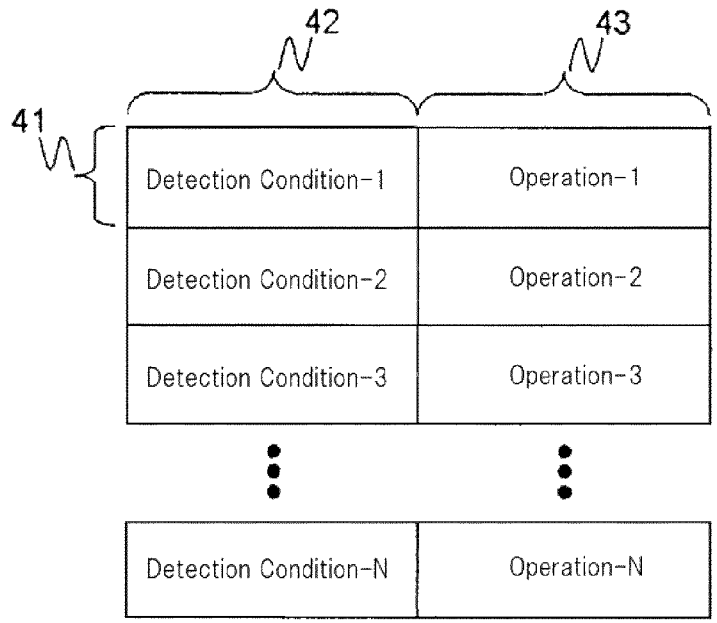
[FIG. 3] is a structural diagram showing a control information list in the first exemplary embodiment.

FIG. 3 is a structural diagram showing a control information list in the first exemplary embodiment. Details of control information list 4 stored in control information list holder 33 will be described using FIG. 3.

Control information list 4 is a list having a plurality of entries 41 arranged therein, each entry 41 being composed of detection condition indicator 42 and operation indicator 43. Detection condition indicator 42 describes the condition for detecting an event to be observed. It is possible to detect an event (target event) that meets the detection condition by comparing an occurring event with the detection condition. Operation indicator 43 describes the operation of controller 32 when a target event has been detected. Examples of the described operation of controller 32 include indication as to data output, indication as to change of the entry to be next referred to, indication to end the measurement, indication to output data to the outside of the LSI (which will hereinbelow be referred to as simply "the outside"), indication to output control information to the outside, and the like.

Figure 4:
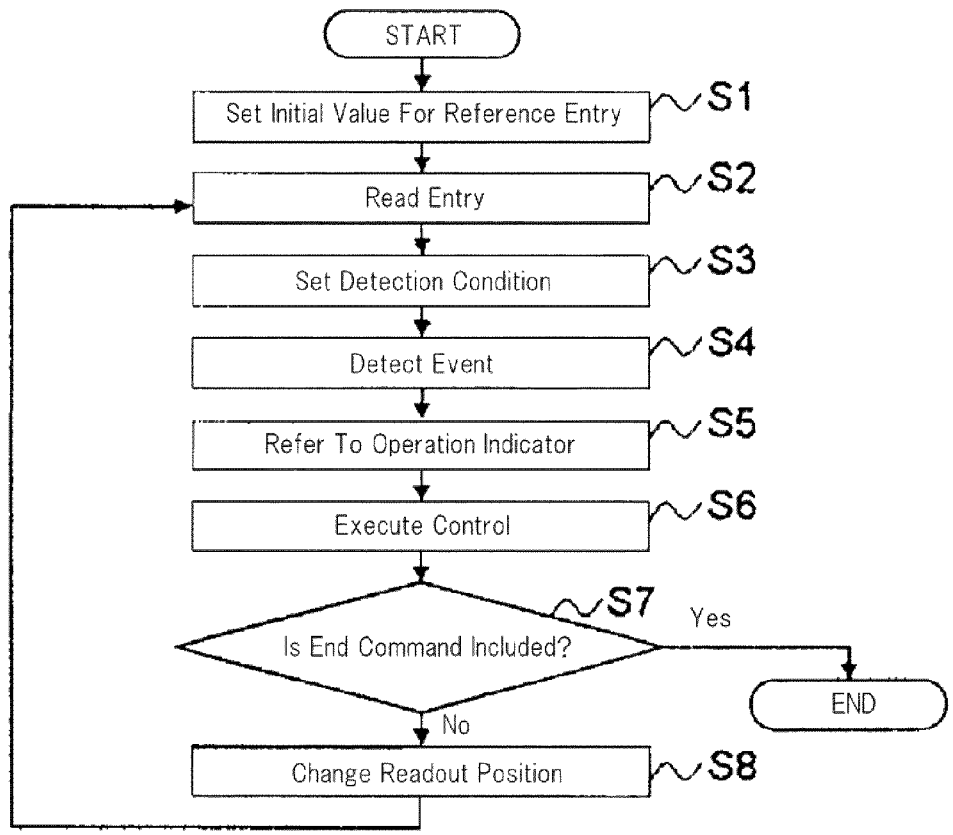
[FIG. 4] is a flow chart showing a processing flow of a debug/trace system in the first exemplary embodiment.

FIG. 4 is a flow chart showing a processing flow of a debug/trace system in the first exemplary embodiment. The operation of the debug/trace system of the present exemplary embodiment will be described based on the flow chart in FIG. 4.

To begin with, when controller 32 receives an observation start command from the outside, controller 32 initializes the entry readout position from control information list 4 held in controller 32 itself (Step S1). At this time, a value of the top entry in control information list 4 is usually designated, but another value may be designated depending on use.

Thereafter, controller 32 reads out one entry 41 from control information list 4 held in control information list holder 33 and holds the value therein (Step S2). Then, controller 32 sets up detection condition for event detector 31 in accordance with detection condition indicator 42 of the retrieved entry 41 (Step S3).

Thereafter, event detector 31 continues comparing events with the set detection condition, and gives an event detection notice to controller 32 when detecting an event that meets the condition for notifying event occurrence (Step S4). The condition for notifying event occurrence is the condition which indicates whether or not occurrence of an event is notified to controller 32. For example, a notice of occurrence of an event may be given only when the event meets the detection condition or a notice of occurrence of an event may be given in either case where the event meets or does not meet the detection condition. Also, event detector 31 holds detailed information on events therein.

Thereafter, controller 32 refers to operation indicator 43 of entry 41 (Step S5) and performs control operations in accordance with an indication of operation indicator 43 (Step S6). Examples of the control operation include reading detailed information of an event from event detector 31 to output it as event data, outputting user data written in control information list 4, outputting control information, typified by error notice and normal end notice, and others.

Controller 32 further determines whether or not an end command is included in the indication from operation indicator 43 of entry 41 (Step S7). If an end command is included in the indication, controller 32 ends the measurement. If no end command is included in the indication, controller 32 changes the entry readout position as required (Step S8), and returns to read out a next entry 41.

Description herein was given in the form of executing the operation one step at a time for description simplicity, but a plurality of steps may be executed at the same time or may be executed in an assembly-line manner based on a pipeline-like method, in order to achieve a high-speed operation.

According to the exemplary embodiment, since control information list 4 including a plurality of entries 41 corresponding to a series of operations that need to be checked has been prepared in advance and since the event detection condition and control are changed one to another in accordance with control information list 4, it is possible to internally check based on many signal variations that particular events have occurred in a particular order and record the trace data. As a result, it becomes possible to trace the event sequences inside the system LSI, hence it is possible to check desired operations while observing arbitrary signals of a high-speed observation target without being affected by the speed of the communication line and by the built-in buffer capacity.

Second Exemplary Embodiment

Next, the second exemplary embodiment of the present invention will be described in detail with reference to the drawings.

Figure 5:
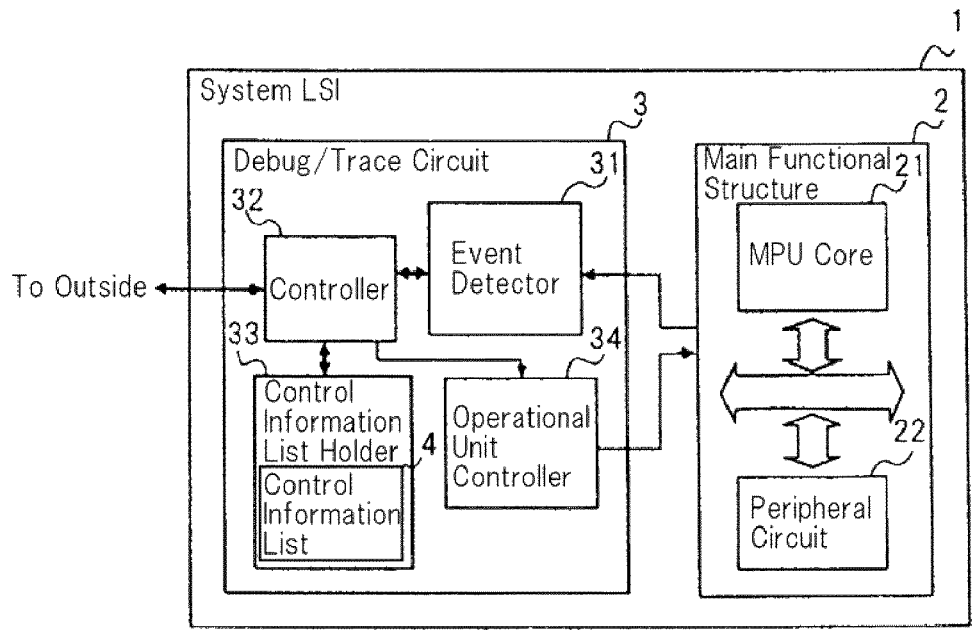
[FIG. 5] is a block diagram showing a configuration of the second exemplary embodiment.

FIG. 5 is a block diagram showing an overall configuration of the second exemplary embodiment of the present invention. In the system LSI of the present exemplary embodiment, main functional structure 21 is composed of operational units such as MPU core 21, DSP, accelerators and the like, each executing a predetermined series of operations. Further, the system LSI of the present exemplary embodiment includes operational unit controller 34 in debug/trace circuit 3, in addition to the first exemplary embodiment shown in FIG. 2. Operational unit controller 34 transmits signals for controlling the operational units in main functional structure 2.

Figure 6:
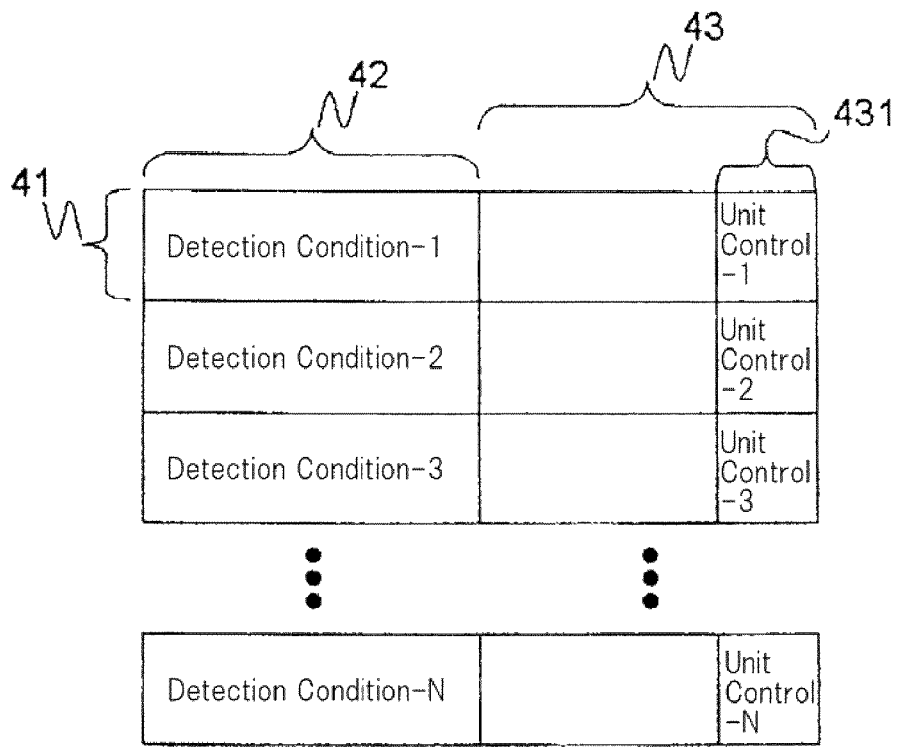
[FIG. 6] is a structural diagram showing a control information list in the second exemplary embodiment.

FIG. 6 is a structural diagram showing a control information list in the second exemplary embodiment. As shown in the control information list structural diagram of FIG. 6, operational unit control indicator 431 exists inside operation indicator 43 of control information list 4. Information written in operational unit control indicator 431 is information on which operational unit inside main functional structure 2 an indication is given to, what kind of a control indication is given or no indication is given, for operational unit controller 34. Examples of control indication include stop command, start command, etc.

Figure 7:
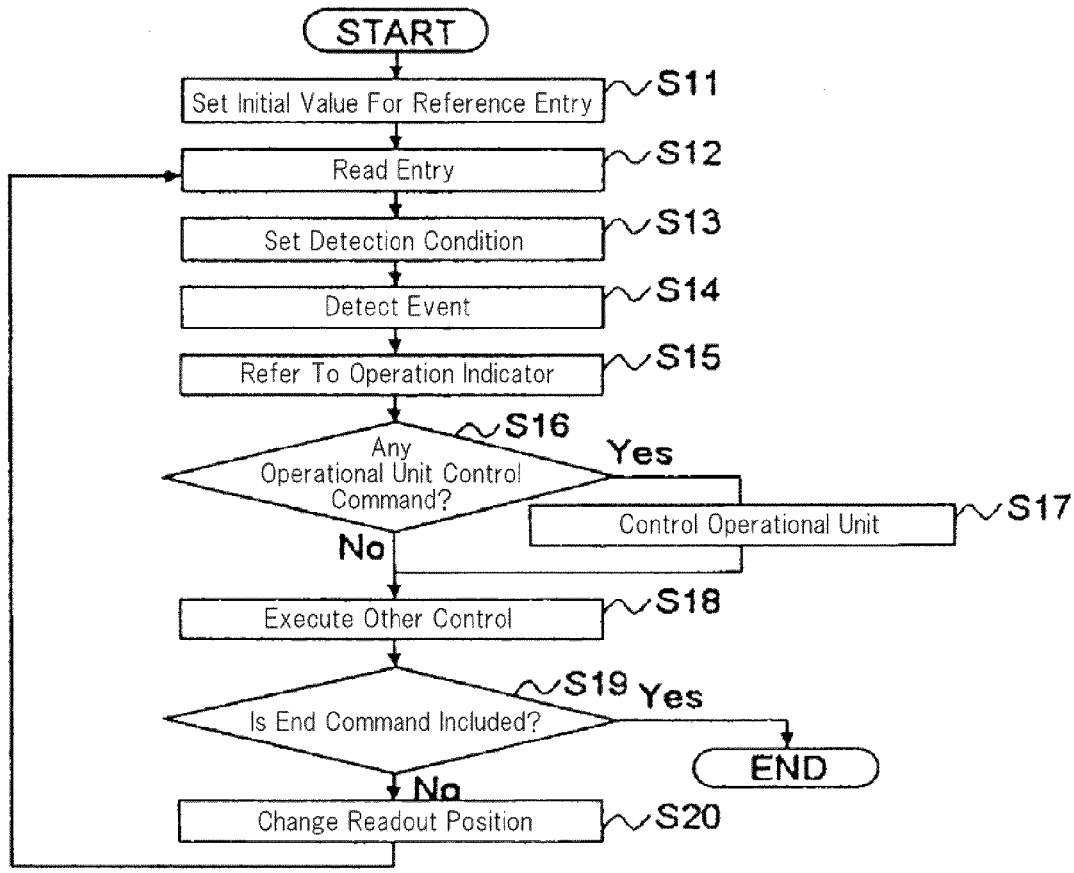
[FIG. 7] is a flow chart showing a processing flow of a debug/trace system in the second exemplary embodiment.

FIG. 7 is a flow chart showing a process flow of a debug/trace system in the second exemplary embodiment. The operation of the debug/trace system of the second exemplary embodiment will be described based on the flow chart in FIG. 7.

To begin with, when controller 32 receives an observation start command from the outside, controller 32 initializes the entry readout position from a control information list held in itself (Step S11). At this time, the top event in the control information list is usually designated, but another value may be designated depending on use.

Thereafter, controller 32 reads out one entry 41 from control information list 4 held in control information list holder 33 and holds the value therein (Step S12). Then, controller 32 sets up a detection condition for event detector 31 in accordance with detection condition indicator 42 of the retrieved entry 41 (Step S13).

Thereafter, event detector 31 continues comparing events with the set detection condition and gives an event detection notice to controller 32 when an event meets the condition for notifying event occurrence (Step S14). The condition for notifying event occurrence is the condition on which whether or not the occurrence of an event is notified to controller 32. For example, a notice of occurrence of an event may be given only when the event meets the detection condition or a notice of occurrence of an event may be given in both cases where the event meets and does not meet the detection condition. Event detector 31 also holds detailed information on events therein.

Thereafter, controller 32, referring to operation indicator 43 of entry 41 (Step S15), determines whether or not any control command to an operational unit exits (Step S16). If there is any control command to an operational unit, controller 32 transmits the operational unit control command to operational unit controller 34. Operational unit controller 34, in accordance with the indication of the received operational unit control command, performs a control operation to the operational unit inside main functional structure 2 (Step S17). Examples of control on an operational unit include suspension, activation, status check and the like of the operational unit.

When no control command to an operational unit existed at the determination of Step S16, or after the control operation at Step S17, controller 32 performs other control operations in accordance with the indication of operation indicator 43 of entry 41 (Step S18). Examples of other control operations include reading detailed information of an event from event detector 31 to output the data, outputting user data written in control information list 4, performing control output, typified by error notice and normal end notice, and others.

Controller 32 further determines whether or not an end command is included in the indication from operation indicator 43 of entry 41 (Step S19). If an end command is included in the indication, controller 32 ends the measurement. If no end command is included in the indication, controller 32 changes the entry readout position as required (Step S20), and returns to readout of next entry.

Herein, for description simplicity, the operation was described by executing one step at a time, but a plurality of steps may be executed at the same time or may be executed in an assembly-line manner based on a pipeline-like method, in order to achieve a high-speed operation.

In debugging, there is a case in which the status such as memory content and the like at the moment a certain event has occurred during program execution needs to be checked. However, if operational units were operating, there is a possibility that the value of the memory content at the location which needs be checked has changed when it is checked after the operation has been ended. Also, if an observation is performed simply based on occurrence of an event, the event which needs to be observed will be included, so that there are cases where it is important to exclude events other than the target.

To deal with this, the present exemplary embodiment, in addition to the function of tracing event sequences similarly to the first exemplary embodiment, further includes operational unit controller 34, and operational unit control indicator 431 in control information list 4 is introduced to use control information list 4 that includes a control command to a particular operational unit suited to the event to be checked. As a result, it is possible to control the operational unit in a manner convenient for observation. For example, it is possible to stop a certain operational unit immediately after occurrence of a target event. Hence, it is possible to check the memory content immediately after occurrence of a certain event and acquire the data associated with the operational unit.

Third Exemplary Embodiment

Figure 8:
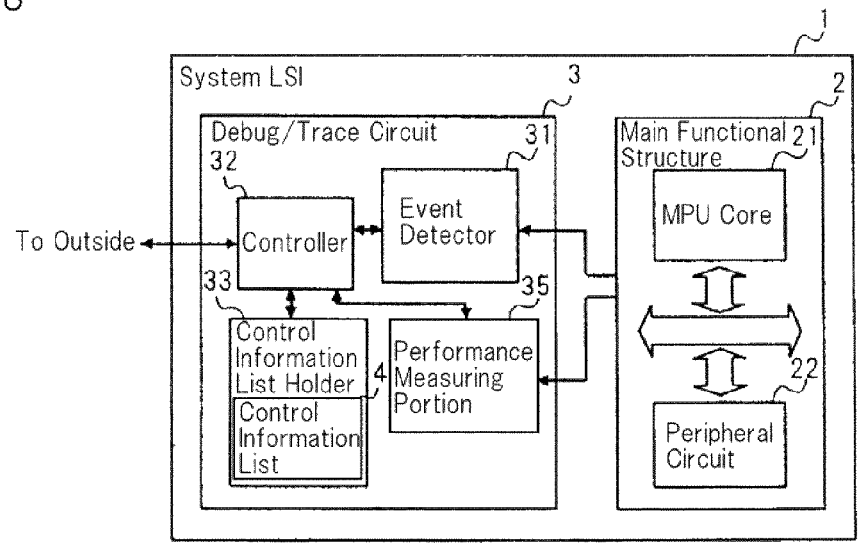
[FIG. 8] is a block diagram showing a configuration of the third exemplary embodiment.

FIG. 8 is a block diagram showing an overall configuration of the third exemplary embodiment of the present invention. Referring to FIG. 8, the system LSI of the present exemplary embodiment includes performance measuring portion 35 in addition to the first exemplary embodiment shown in FIG. 2. Performance measuring portion 35 measures performance such the frequency of occurrence of events, the amount of bus traffic, the delay values and the like, in accordance with the input command information.

Figure 9:
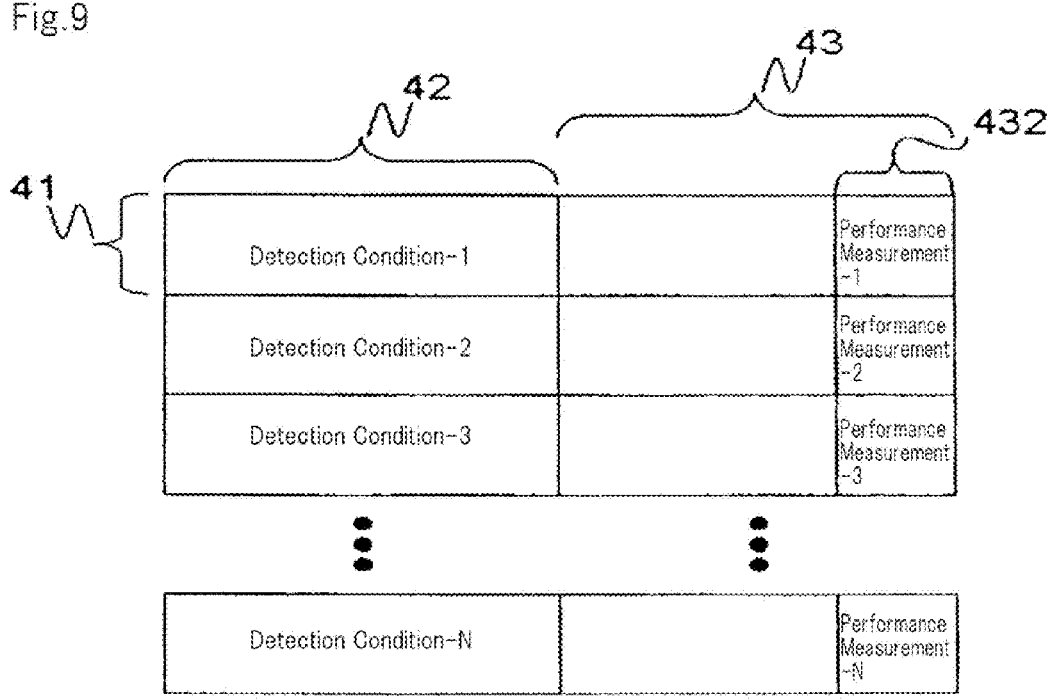
[FIG. 9] is a structural diagram showing a control information list in the third exemplary embodiment.

FIG. 9 is a structural diagram showing a control information list in the third exemplary embodiment. As shown in the control information list structural diagram of FIG. 9, performance measurement control indicator 432 exists inside operation indicator 43 of control information list 4. Written in performance measurement control indicator 432 is command information to performance measuring portion 35 to control performance measurement. Examples of command information include a command for setting up a parameter that indicates what kind of performance measurement is performed and a command for starting or ending the performance measurement.

Figure 10:
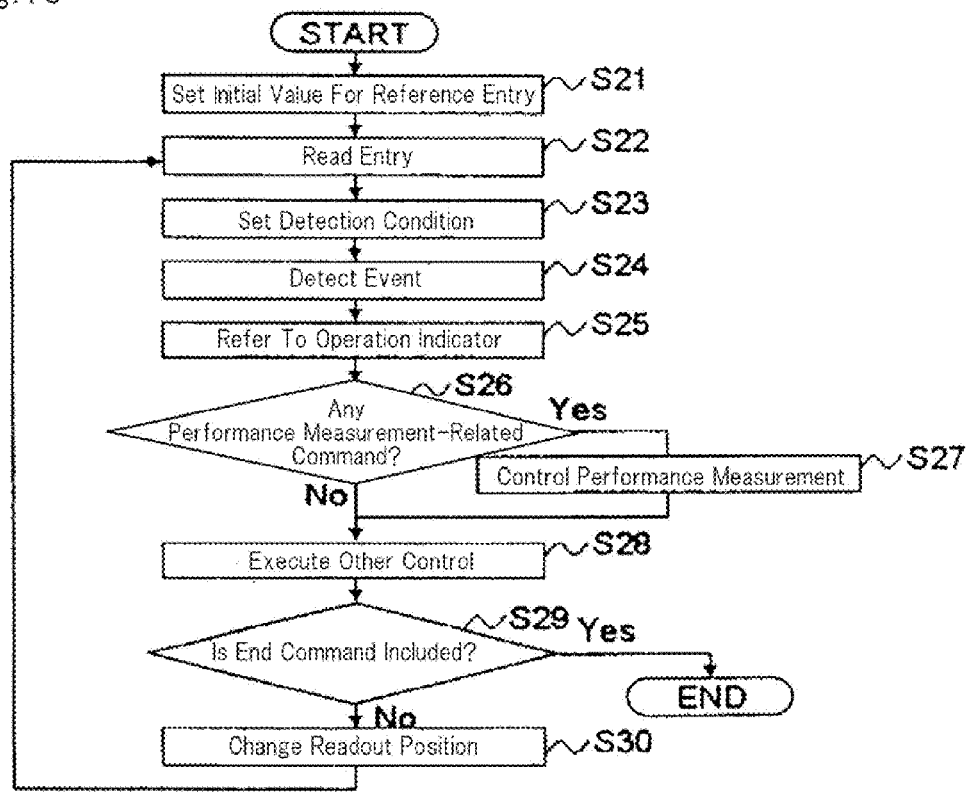
[FIG. 10] is a flow chart showing a processing flow of a debug/trace system in the third exemplary embodiment.

FIG. 10 is a flow chart showing a process flow of a debug/trace system in the third exemplary embodiment. The operation of the debug/trace system of the third exemplary embodiment will be described based on the flow chart in FIG. 10.

To begin with, when controller 32 receives an observation start command from the outside, controller 32 initializes the entry readout position from a control information list held in itself (Step S21). At this time, the top entry in the control information list is usually designated, but another value may be designated depending on use.

Thereafter, controller 32 reads out one entry 41 from control information list 4 held in control information list holder 33 and holds the value therein (Step S22). Then, controller 32 sets up detection condition for event detector 31 in accordance with detection condition indicator 42 of retrieved entry 41 (Step S23).

Thereafter, event detector 31 continues comparing events with the set detection condition and gives an event detection notice to controller 32 when an event meets the condition for notifying event occurrence (Step S24). The condition for notifying event occurrence is the condition on which whether or not occurrence of an event is notified to controller 32. For example, a notice of occurrence of an event may be given only when the event meets the detection condition or a notice of occurrence of an event may be given in both cases where the event meets and does not meet the detection condition. Event detector 31 also holds detailed information on events.

Thereafter, controller 32, referring to operation indicator 43 of entry 41 (Step S25), determines whether or not there is any command information on performance measurement (Step S26).

If there is any command information as to performance measurement, controller 32 transmits the command information as to performance measurement to performance measuring portion 35. Performance measuring portion 35, in accordance with the command information received from controller 32, controls performance measurement (Step S27). Examples of performance measurement control include setup of measurement targets and measurement items, starting and ending of measurement, and the like.

When there is no control command as to performance measurement existed at the determination of Step S26, or after the control operation at Step S27, controller 32 performs other control operations in accordance with the content of indication of operation indicator 43 of entry 41 (Step S28). Examples of other control operations include reading detailed information of an event from event detector 31 to output the data, outputting user data written in control information list 4, performing control output, typified by error notice and normal end notice, and others.

Controller 32 further determines whether or not an end command is included in the indication from operation indicator 43 of entry 41 (Step S29). If an end command is included in the content of indication, controller 32 ends the measurement. If no end command is included in the indication, controller 32 changes the entry readout position as required (Step S30), and returns to readout of the next entry.

Description herein was given in the form of executing the operation one step at a time for description simplicity, but a plurality of steps may be executed at the same time or may be executed in an assembly-line manner based on a pipeline-like method, in order to achieve a high-speed operation.

In debugging a program or tuning its performance, there is a case in which measurement targets and measurement items are need to be changed depending on the occurrence of a certain event during program execution. There is also a case where measurement needs to be started or ended depending on an occurrence of a certain event. If an observation is performed simply based on an occurrence of an event, there is a case in which data that is not needed to be measured is measured. In such a case, it is important to remove such events other than those to be measured.

To deal with this, the present exemplary embodiment, in addition to the function of tracing event sequences similarly to the first exemplary embodiment, further includes performance measuring portion 35, and performance measurement control indicator 432 is introduced in control information list 4 to use control information list 4 that includes a control command as to performance measurement suited to the event to be checked. As a result, it is possible to control the measurement operation in accordance with the event. For example, it is possible to start or end measurement immediately after occurrence of a target event. It is also possible to change the measurement target and the content of measurement immediately after occurrence of an event to be the target.

First Example

Next, specific examples of the above exemplary embodiments will be described.

Figure 11:
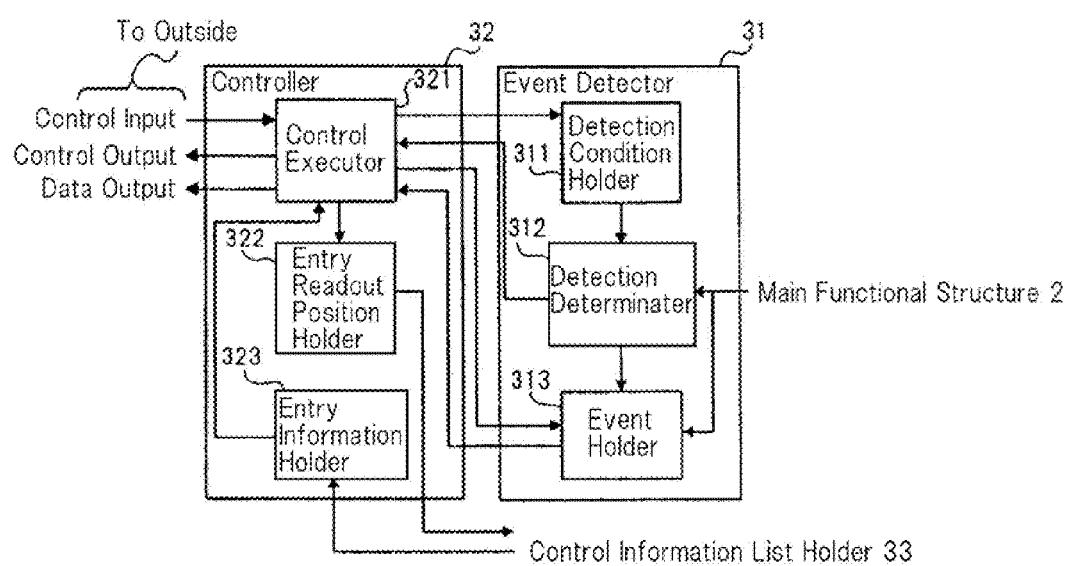
[FIG. 11] is a block diagram showing a specific configuration of a controller and an event detector used in common in the first and second examples.

FIG. 11 is a block diagram showing a specific configuration of event detector 31 and controller 32. Referring to FIG. 11, event detector 31 is composed of detection condition holder 311, condition determinater 312 and event holder 313.

Detection condition holder 311 holds condition for detecting events. Condition determinater 312 observes the signals from main functional structure 2 to controller 32 to determine whether or not each event meets the detection condition held at detection condition holder 311. When an event meets the detection condition, condition determinater 312 sends an event detection notice to controller 32. Event holder 313 holds the details of the event detected by condition determinater 312.

With this arrangement, event detector 31 holds the detection condition set from controller 32 in detection condition holder 311, detects occurrence of an event at condition determinater 312 if an event that matches the detection condition occurs, and holds the details of the event at event holder 313.

On the other hand, controller 32 is composed of control executor 321, entry readout position holder 322 and entry information holder 323.

Control executor 321 performs control in accordance with control information list 4 and gives operation indications to each portion in association with it. Entry readout position holder 322 holds the position of control information entry 4 to be read out next from control information list holder 33. Entry information holder 323 holds the information of entry 4 read out from control information list holder 33.

With this configuration, controller 32 reads out entry 4 designated by the positional information held at entry readout position holder 322, from control information list holder 33, holds it in entry information holder 323 and performs control in accordance with entry 4 held at entry information holder 323.

Figure 12:
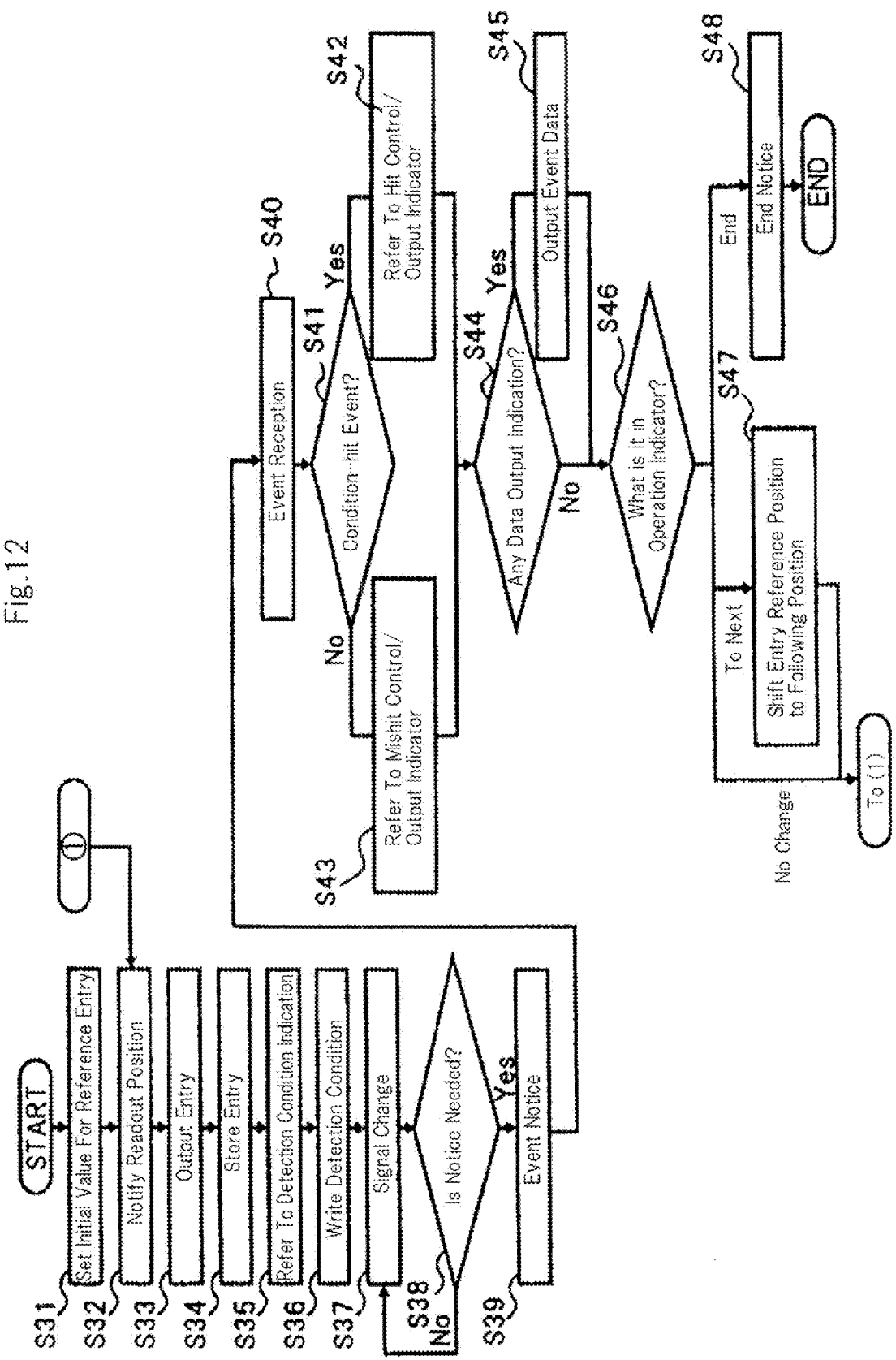
[FIG. 12] is a flow chart showing a processing flow of a debug/trace system in the first example.
Figure 13:
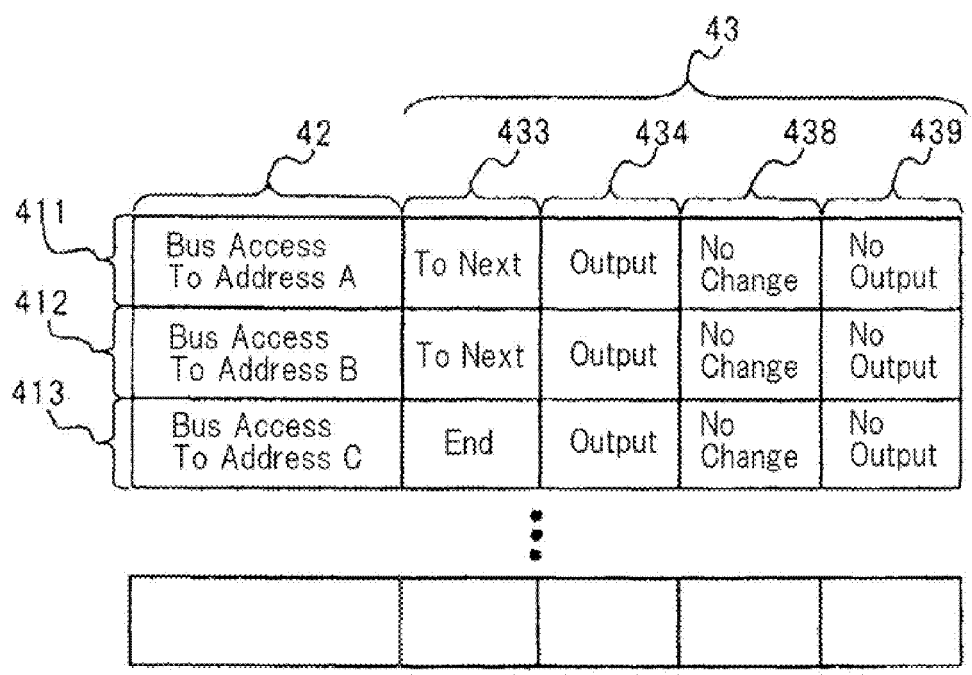
[FIG. 13] is a structural diagram showing a control information list in the first example.

FIG. 12 is a flow chart showing a process flow of a debug/trace system in the first example. FIG. 13 is a structural diagram showing a control information list in the first example.

The operation in this example will be described based on FIGS. 12 and 13.

Here, Step S32 to Step S34 in FIG. 12 correspond to Step S2 in FIG. 4. Step S35 to Step S36 correspond to Step S3 in FIG. 4. Further, Step S37 to Step S40 correspond to Step S4 in FIG. 4.

In the example of control information list 4 in FIG. 13, operation indicator 43 incorporates hit control indicator 433, hit output indicator 434, mishit control indicator 438 and mishit output indicator 439.

Hit control indicator 433 is an operation indication for specifying the operation inside debug/trace circuit 3 when an event meeting the detection condition was detected (at the time of hit). Hit output indicator 434 is information for designating whether or not event data at the time of hit is output.

Mishit control indicator 438 is an operation indication for specifying the operation when an event other than the detection condition was detected (at the time of mishit). Mishit output indicator 439 is information for designating whether or not event data at the time of mishit is output.

Herein, as a simple example, one hit control indicator 433 and one hit output indicator 434 are shown. However, the present invention should not be limited to this. As another example, it is possible to construct entries 41 such that a plurality of detection conditions can be set in detection condition indicator 42 and a plurality of hit control indicators 433 and hit output indicators 434 can be set in operation indicator 43. With this construction, it is possible to set up entries 41 so as to perform a different process depending on the content of the detected event.

Referring to FIG. 12, at first, when an observation start command is input to controller 32 from the outside, control executor 321 sets the initial value into entry readout position holder 322 (Step S31). When entry readout position holder 322 is set with the initial value, the position from which an entry is read out from control information list 4 is initialized. At this time, the top in control information list 4 is usually designated, but another value may be designated depending on use.

Thereafter, controller 32 gives notice of the readout position from entry readout position holder 322 to control information list holder 33 (Step S32). Control information list holder 33 outputs entry 41 corresponding to the notified readout position (Step S33). Controller 32 stores entry 41 output from control information list holder 33 into entry information holder 323 located inside (Step S34).

Next, control executor 321 refers to detection condition indicator 42 of entry 41 stored in entry information holder 323 (Step S35) and writes the detection condition indicated therein into detection condition holder 311 of event detector 31 (Step S36).

Thereafter, when a change in the signal from main functional structure 2 occurs (Step S37), condition determinater 312 in event detector 31 determines whether or not the change meets the condition for notifying an event, based on the observation result of the signal and the detection condition held at detection condition holder 311 (Step S38). If any occurrence of an event that meets the notice condition is not detected when the notice condition is confirmed, condition determinater 312, returning to Step S37, repeats the same process until an event that meets the notice condition occurs. On the other hand, when occurrence of an event that meets the notice condition is detected when the notice condition is confirmed, condition determinater 312 transmits an event detection notice to controller 32 (Step S39).

As receiving an event detection notice (Step S40), control executor 321 determines whether it is a hit notice or a mishit notice (Step S41). A hit notice is information which, when the notice condition includes information that the detection condition is satisfied, gives notice that the notice condition (detection condition) was satisfied. A mishit notice is information which, when the notice condition includes information that the detection condition is not satisfied, gives notice that the notice condition was satisfied (that is, detection condition was not satisfied).

If a hit notice is given, control executor 321, acquires the content of the control to be performed by referring to hit control indicator 433 of entry 41 stored in entry information holder 323, and acquires the information as to whether or not event data needs to be output by referring to hit output indicator 434 (Step S42). On the other hand, if a mishit notice is given, control executor 321, acquires the content of the control to be performed by referring to mishit control indicator 438 of entry 41 stored in entry information holder 323, and acquires the information as to whether or not event data needs to be output by referring to mishit output indicator 439 (Step S43).

Subsequently, control executor 321 determines whether or not event data needs to be output, based on the information acquired at Step S42 or Step S43 (Step S44). If event data needs to be output, control executor 321 reads out the detailed information on the stored events from event holder 313 of event detector 31 and outputs the necessary information as event data (Step S45).

When it was determined at Step S44 that event data does not need to be output, or when event data was output at Step S45, control executor 321 executes control in accordance with the control content acquired at Step S42 or Step S43 (Step S46). The control content has been given in hit control indicator 433 or in mishit control indicator 438.

When the indication is "no change", control executor 321 returns to Step S32 without doing anything. If the indication is "to the next", control executor 321 rewrites the value in entry readout position holder 322 to the value that represents the position of the next entry (Step S47), and returns to Step S32. If the indication is "end", control executor 321 outputs an end notice to the outside (Step S48) and ends the measurement.

Description herein was given in the form of executing the operation one step at a time for description simplicity, but a plurality of steps may be executed at the same time or may be executed in an assembly-line manner based on a pipeline-like method, in order to achieve a high-speed operation.

Here, the operation shown in FIG. 12 becomes different partly in the steps to be executed, depending on how the operation of event detector 31 is defined.

For example, if event detector 31 is specified to operate such as to send an event detection notice at Step S39 only when the observed result has satisfied the detection condition at Step S38, no transition from Step S41 to Step S43 will occur on the control executor 321 side.

On the other hand, if, for example, event detector 31 is specified to operate such as to send an event detection notice when the observed result has satisfied the detection condition or not at Step S38, event detector 31 will never perform a repeating operation on the "No" route to return to Step S37.

Alternatively, when the hit notice condition and mishit notice condition are defined separately while event detector 31 is specified to send an event detection notice to controller 32 when either of these is satisfied, there is a chance that both event detector 31 and controller 32 will execute all the steps shown in FIG. 12.

Further, even when, with a notice condition defined, event detector 31 is specified to send an event detection notice to controller 32 when the notice condition is satisfied and to define the scope for hit notice within the notice condition, there is a chance that both event detector 31 and controller 32 will execute all the steps shown in FIG. 12.

Next, the observing method in this example will be described taking a specific example of control information list 4 shown in FIG. 13. Here, an example in which the fact that the signal from main functional structure 2 has agreed with the set value as a detection condition is handled as the event that satisfies the detection condition will be illustrated. This corresponds to an access-associated event. For example, there are cases where a particular access to a bus, memory, or a register of a peripheral circuit is regarded as an event that meets the detection condition. In access-related events, an access to a particular address, an access having data of a particular value, an access from a particular operational unit, and others are able to be set as the event to be detected. As another example, there are cases where the value of a timer, counter or register having taken a predetermined value is regarded as an event that meets the detection condition.

One particular value may be set as the detection condition, but another method also may be applicable. As another example, there is a method in which a range is set with an upper limit and a lower limit. There is also another conceivable method in which a particular set value of a plurality of bits is designated and a mask value is used so as to determine whether each bit of the set value is made valid or invalid when compared to the observation signal. There is another conceivable method in which a bit map is used to determine whether comparison is made valid or invalid for every accessor. Further, the above-described plural methods may be used in combination.

Referring to FIG. 13, control information list 4 includes three entries 411, 412 and 413.

Detection condition indicator 42 of entry 411 is set with "bus access to address A". Accordingly, if there is a bus access to address A, it is detected as an event of entry 411. Similarly, detection condition indicator 42 of entry 412 is set with "bus access to address B". Detection condition indicator 42 of entry 413 is set with "bus access to address C".

Hit control indicators 433 of entry 411 and entry 412 are set with "to the next". "To the next" indicates going forward to monitor the next entry. Accordingly, when, for instance, an event of entry 411 is hit, the control goes to monitor the next entry 412. Similarly, when an event of entry 412 is hit, the control goes to monitor the next entry 413.

Hit control indicator 433 of entry 413 is set with "end". "End" indicates that the measurement is completed at that point. Accordingly, if an event of entry 413 is hit, the measurement is ended at that point.

Hit output indicators 434 of entries 411 to 413 are set with "output". "Output" indicates outputting of event data. Accordingly, when, for instance, an event of entry 411 is hit, the event data at that time is output. Similarly, when an event of entry 412 is hit, the event data at that time is output. When an event of entry 413 is hit, the event data at that time is output.

Mishit control indicator 438 of entries 411, 412 and 413 are set with "no change" while mishit output indicator 439 are set with "no output". "No change" indicates continuation of monitoring the same entry without changing the entry. "No output" indicates non-outputting of event data. Accordingly, when, for instance, no event of entry 411 is hit, monitoring the event of entry 411 is continued as is while no event data will be output. Similarly, when no event of entry 412 is hit, monitoring the event of entry 412' is continued as is while no event data will be output. When no event of entry 413 is hit, monitoring the event of entry 413 is continued as is while no event data will be output.

When measurement is started using the control information list 4 set as above, entry 411 is designated as the initial value of the entry to be referred to first. When the signal from main functional structure 2 is one other than bus access to address A, the state of waiting for a bus access to address A to be observed continues without changing the entry to be referred to as the monitoring target and without outputting event data.

If a bus access to address A occurs, an event of entry 411 is detected. As a result, the entry to be referred to is changed to entry 412, and the data value at the access to address A is output as the event data.

Similarly, in the observation referring to entry 412, the state of waiting for a bus access to address B to be observed continues. When it is observed, its event data is output and the operation goes to the observation referring to entry 413. In the observation referring to entry 413, when a bus access to address C is observed, the event data is output to end the measurement.

As above, use of control information list 4 thus set as in FIG. 13 makes it possible to acquire the event data (e.g. data value) of each bus access as the trace data when bus accesses occurred in the order of addresses A, B and C, being mixed with various events during execution of a certain program. Since no unnecessary data will be acquired, the buffer capacity required for data recording can be markedly cut down. Further, since event detection and data recording can be done following control information list 4 without the need of successive operations from the outside of the system LSI, the operation will not be limited by the speed of the communication line to the outside.

Second Example

The specific configurations of event detector 31 and controller 32 of the second example are the same as those of the first example shown in FIG. 11.

Figure 14:
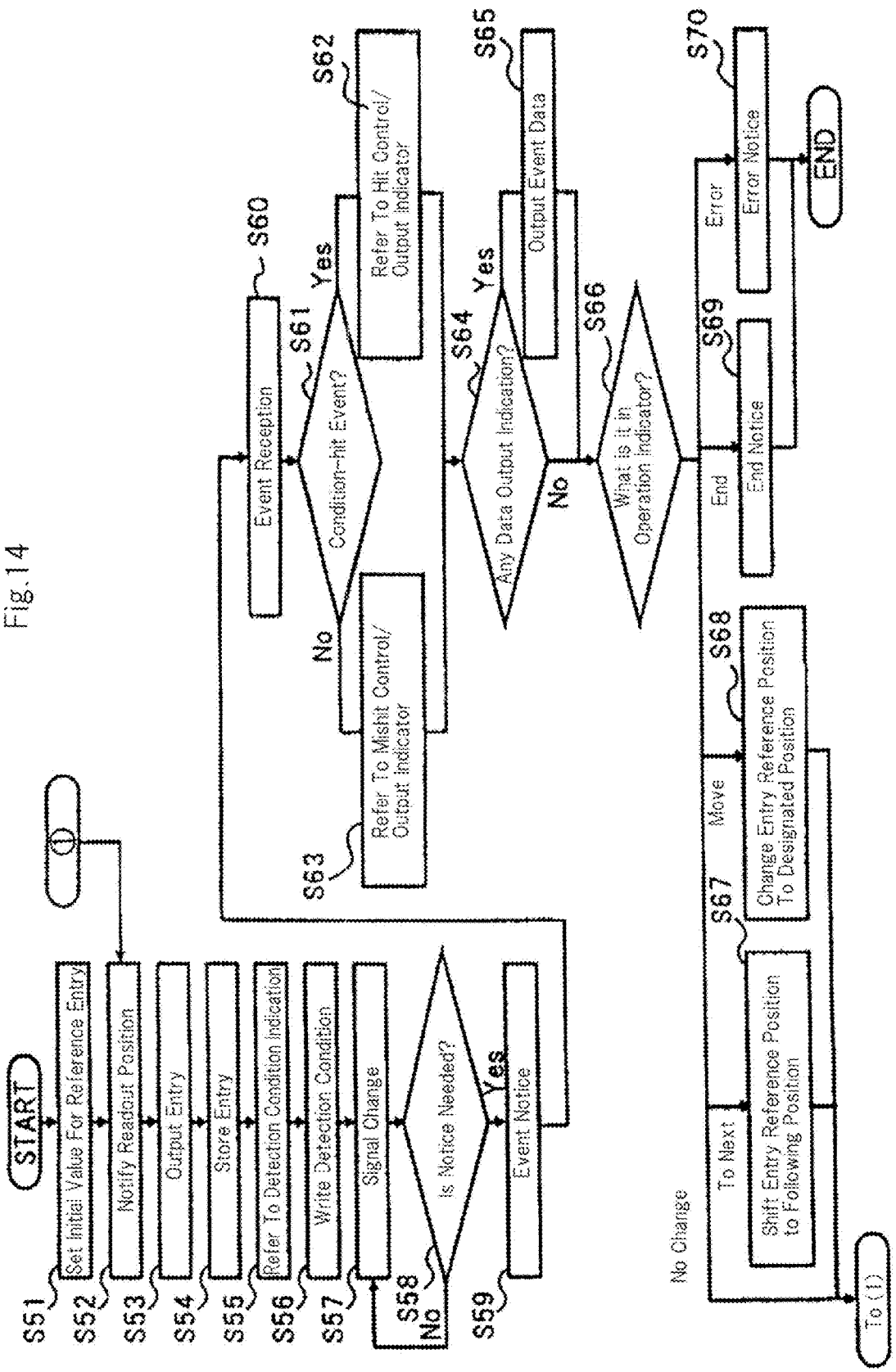
[FIG. 14] is a flow chart showing a processing flow of a debug/trace system in the second example.
Figure 15:
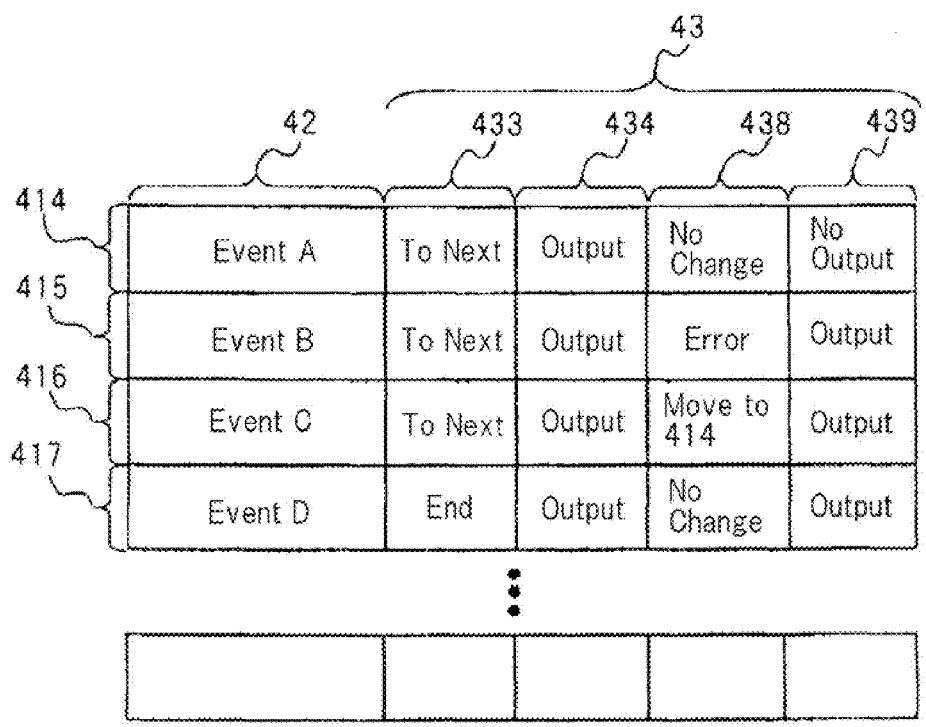
[FIG. 15] is a structural diagram showing a control information list in the second example.

FIG. 14 is a flow chart showing a process flow of a debug/trace system in the second example. FIG. 15 is a structural diagram showing a control information list in the second example.

The operation in this example will be described based on FIGS. 14 and 15.

Here, Step S52 to Step S54 in FIG. 14 correspond to Step S2 in FIG. 4. Step S55 to Step S56 correspond to Step S3 in FIG. 4. Further, Step S57 to Step S60 correspond to Step S4 in FIG. 4.

In the example of control information list 4 shown in FIG. 15, similarly to the example in FIG. 13, operation indicator 43 incorporates hit control indicator 433, hit output indicator 434, mishit control indicator 438 and mishit output indicator 439.

Hit control indicator 433 is an operation indication for specifying the operation inside debug/trace circuit 3 when an event meeting the detection condition was detected (at the time of hit). Hit output indicator 434 is information for designating whether or not event data at the time of hit is output.

Mishit control indicator 438 is an operation indication for specifying the operation when an event other than the detection condition is detected (at the time of mishit). Mishit output indicator 439 is information for designating whether or not event data at the time of mishit is output.

Herein, as a simple example, one hit control indicator 433 and one hit output indicator 434 are shown. However, the present invention should not be limited to this. As another example, it is possible to construct entries 41 such that a plurality of detection conditions can be set in detection condition indicator 42 and a plurality of hit control indicators 433 and hit output indicators 434 can be set in operation indicator 43. With this construction, it is possible to set up entries 41 so as to perform a different process depending on the content of the detected event.

Referring to FIG. 14, at first, when an observation start command is input to controller 32 from the outside, control executor 321 sets the initial value into entry readout position holder 322 (Step S51). When entry readout position holder 322 is set with the initial value, the position from which an entry is read out from control information list 4 is initialized. At this time, the top in control information list 4 is usually designated, but another value may be designated depending on use.

Thereafter, controller 32 gives notice of the readout position from entry readout position holder 322 to control information list holder 33 (Step S52). Control information list holder 33 outputs entry 41 corresponding to the notified readout position (Step S53). Controller 32 stores entry 41 output from control information list holder 33 into entry information holder 323 located inside (Step S54).

Next, control executor 321 refers to detection condition indicator 42 of entry 41 stored in entry information holder 323 (Step S55) and writes the detection condition indicated therein into detection condition holder 311 of event detector 31 (Step S56).

Thereafter, when a change in the signal from main functional structure 2 occurs (Step S57), condition determiner 312 in event detector 31 determines whether or not the change meets the condition for notifying an event, based on the observation result of the signal and the detection condition held at detection condition holder 311 (Step S58). If any occurrence of an event that meets the notice condition is not detected when the notice condition is confirmed, condition determiner 312, returning to Step S57, repeats the same process until an event that meets the notice condition occurs. On the other hand, when occurrence of an event that meets the notice condition is detected when the notice condition is confirmed, condition determiner 312 transmits an event detection notice to controller 32 (Step S59).

As receiving an event detection notice (Step S60), control executor 321 determines whether it is a hit notice or a mishit notice (Step S61). A hit notice is information which, when the notice condition includes information that the detection condition is satisfied, gives notice that the notice condition (detection condition) was satisfied. A mishit notice is information which, when the notice condition includes information that the detection condition is not satisfied, gives notice that the notice condition was satisfied (that is, detection condition was not satisfied).

If a hit notice is given, control executor 321, acquires the content of the control to be performed by referring to hit control indicator 433 of entry 41 stored in entry information holder 323, and acquires the information as to whether or not event data needs to be output by referring to hit output indicator 434 (Step S62). On the other hand, if a mishit notice is given, control executor 321, acquires the content of the control to be performed by referring to mishit control indicator 438 of entry 41 stored in entry information holder 323, and acquires the information as to whether or not event data needs to be output by referring to mishit output indicator 439 (Step S63).

Subsequently, control executor 321 determines whether or not event data needs to be output, based on the information acquired at Step S42 or Step S63 (Step S64). If event data needs to be output, control executor 321 reads out the detailed information on the stored events from event holder 313 of event detector 31 and outputs the necessary information as event data (Step S65).

When it was determined at Step S64 that event data does not need to be output, or when event data was output at Step S65, control executor 321 executes control in accordance with the control content acquired at Step S62 or Step S63 (Step S66). The control content has been given in hit control indicator 433 or in mishit control indicator 438.

When the indication is "no change", control executor 321 returns to Step S52 without doing anything. If the content of indication is "to the next", control executor 321 rewrites the value in entry readout position holder 322 to the value that represents the position of the next entry (Step S67), and returns to Step S52. If the content of indication is "move", control executor 321 rewrites the value in entry readout position holder 322 to the value that represents the designated entry readout position, and returns to Step S52. If the content of indication is "end", control executor 321 outputs an end notice to the outside (Step S69) and ends the measurement. If the content of indication is "error", control executor 321 outputs an error notice to the outside (Step S70) and ends the measurement.

Description herein was given in the form of executing the operation one step at a time for description simplicity, but a plurality of steps may be executed at the same time or may be executed in an assembly-line manner based on a pipeline-like method, in order to achieve a high-speed operation.

Next, the observing method in this example will be described taking a specific example of control information list 4 shown in FIG. 15. Here, an example in which a change of a particular signal from main functional structure 2 is handled as the event that satisfies the detection condition will be illustrated. For example, there are cases where the fact that a cut-in signal or control signal becomes valid or invalid is regarded as an event that meets the detection condition. There is also a case where the fact that a certain operational unit changes in state is regarded as an event.

Though the event detection condition may be set for one particular signal as a detection condition, another method also may be applicable. As another example, there is a conceivable method in which the values of detection conditions for a plurality of events are designated, and a bit map is used to set whether these are made valid or invalid for each event. This arrangement makes it possible to designate a particular event group.

Referring to FIG. 15, control information list 4 includes three entries 414, 415, 416 and 417.

Detection condition indicator 42 of entry 414 is set with "event A". Accordingly, if event address A occurs, it is detected as an event of entry 414. Similarly, detection condition indicator 42 of entry 415 is set with "event B". Detection condition indicator 42 of entry 416 is set with "event C". Detection condition indicator 42 of entry 417 is set with "event D".

Hit control indicators 433 of entry 414, entry 415 and entry 416 are set with "to the next". "To the next" indicates going forward to monitor the next entry. Accordingly, when, for instance, an event of entry 414 is hit, the control goes to monitor the next entry 415. Similarly, when an event of entry 415 is hit, the control goes to monitor the next entry 416. When an event of entry 416 is hit, the control goes to monitor the next entry 417.

Hit control indicator 433 of entry 417 is set with "end". "End" indicates that the measurement is completed at that point. Accordingly, if an event of entry 417 is hit, the measurement is ended at that point.

Hit output indicators 434 of entries 414 to 417 and mishit output indicator 439 of entries 415 to 417 are set with "output". "Output" indicates outputting of event data. Accordingly, when, for instance, an event of entry 414 is hit, the event data at that time is output. Similarly, when an event of entry 415, 416 or 417 is hit, the event data at that time is output. When an event of entry 415, 416 or 417 is mishit, the event data at that time is output.

Mishit control indicators 438 of entries 414 and 417 are set with "no change". "No change" indicates continuation of monitoring the same entry without changing the entry. Accordingly, when no event of entry 414 or 417 is hit, monitoring the event of entry 414 is continued as is.

Mishit output indicator 439 of entry 414 is set with "no output". "No output" indicates non-outputting of event data. Accordingly, when no event of entry 414 is hit, no event data will be output.

Mishit control indicator 438 of entry 415 is set with "error". "Error" indicates giving an error notice to the outside and ending the measurement at that point. Accordingly, when an event of entry 415 is mishit, an error notice is output and the measurement is ended at that point.

Mishit control indicator 438 of entry 416 is set with "move to 414". "Move" indicates going forward to monitor a designated entry. In this case, "414" is designated as the destination. Accordingly, when an event of entry 416 is mishit, the control goes to monitor entry 414.

When measurement is started using control information list 4 set as above, entry 414 is designated as the initial value of the entry to be referred to first. Hereby, monitoring of event A is started. If the detected event is other than event A, the entry to be referred to as the monitoring target is not changed and no event data is output, and the state of waiting for event A to be observed continues. When event A occurs, an event of entry 414 is detected. As a result, the entry to be referred to is changed to entry 415, and event data is output. The event data is information associated with the detected event, for example.

When a next event is observed after event A has been observed, the content of entry 415 is referred to. In entry 415, an error notice is output when an event other than event B was detected, and the event data is output to end the measurement. When the measurement was terminated due to error, it is possible to check what happened by examining the event data.

On the other hand, when event B was observed, the entry to be referred to is changed to entry 416 and event data is output. When a next event is detected after event B has been observed, the content of entry 416 is referred to. In entry 416, the operation returns to entry 414 so that monitoring of event A is started when an event other than event C is detected. Though the fact that an event is other than event C is not an error, because it is not the trace condition either, the operation is started once again from monitoring of event A.

When event C was detected, then the content of entry 417 is referred to. In entry 417, when an event other than event D is detected, the event data is output but the entry to be referred to will not be changed. As a result, the event data of all the events will be recorded as trace data until event D is detected. When event D is detected, an end notice is output to terminate the measurement at that point.

As above, use of the control information list 4 thus set as in FIG. 15 makes it possible to start tracing of events when events A, B and C have occurred in succession during execution of a certain program and terminate the trace when event D occurs.

Having described the present invention referring to the exemplary embodiments and examples, the present invention should not be limited to the above exemplary embodiments and examples. Various changes that can be understood to those skilled in the art can be made in the configuration and detail of the present invention defined in claims, within the scope of the present invention.

The invention claimed is:

1. A semiconductor integrated circuit having a debugging function, comprising:
   a main functional structure that executes continuous predetermined operations to continuously generate events associated with said operations; and a debug/trace circuit, which stores beforehand a control information list including a plurality of entries in a sequential manner so as to identify an event which needs an observation based on a series of events, each entry consisting of a set of detection condition indicating information to detect generation of a target event and operation indicating information to designate an operation in accordance with the result of comparison between said detection condition indicating information and the event occurring at said main functional structure, and which continuously performs in accordance with said control information list, comparison of an event occurring at said main functional structure with the detection condition indicating information of one entry in said control information list, and execution of the operation designated by said operation indicating information paired with said detection condition indicating information in accordance with the result of said comparison, to identify said event.

2. The semiconductor integrated circuit according to claim 1, wherein said operation indicating information includes output indicating information that specifies whether or not event data is output and control indicating information that specifies the internal operation of said debug/trace circuit.

3. The semiconductor integrated circuit according to claim 1, wherein said operation indicating information includes hit control indicating information that selects the operation when an event meeting said detection condition indicating information has occurred and mishit operation indicating information that selects the operation when an event not meeting said detection condition indicating information has occurred.

4. The semiconductor integrated circuit according to claim 1, wherein
said main functional structure includes operational units,
said operation indicating information includes operational unit control indicating information that selects said operational unit and indicates its operation, and
said debug/trace circuit transmits a control signal to said operational unit in accordance with said operational unit control indicating information.

5. The semiconductor integrated circuit according to claim 1, wherein
said operation indicating information includes performance measurement control indicating information that indicates control of the operation as to measurement, and
said debug/trace circuit controls the operation as to measurement in accordance with said performance measurement control information.

6. A debug/trace circuit built in a semiconductor integrated circuit including a main functional structure that executes continuous predetermined operations to continuously generate events associated with said operations, comprising:
a control information list holder which stores beforehand a control information list including a plurality of entries in a sequential manner so as to identify an event which needs an observation based on a series of events, each entry consisting of a set of detection condition indicating information to detect generation of a target event and operation indicating information to designate an operation in accordance with the result of comparison between said detection condition indicating information and the event occurring at said main functional structure;
an event detector which continuously performs in accordance with said control information list, comparison of an event occurring at said main functional structure with the detection condition indicating information of one entry in said control information list; and,
a controller which, in accordance with the result of said comparison from said event detector, executes the operation designated by said operation indicating information paired with said detection condition indicating information.

7. The debug/trace circuit according to claim 6, wherein said operation indicating information includes output indicating information that specifies whether or not event data is output and control indicating information that specifies the internal operation of said debug/trace circuit.

8. The debug/trace circuit according to claim 6, wherein said operation indicating information includes hit control indicating information that selects the operation when an event meeting said detection condition indicating information has occurred and mishit operation indicating information that selects the operation when an event not meeting said detection condition indicating information has occurred.

9. The debug/trace circuit according to claim 6, wherein
said main functional structure includes operational units,
said operation indicating information includes operational unit control indicating information that selects said operational unit and indicates its operation, and
said debug/trace circuit further includes an operational unit controller which transmits a control signal to said operational unit in accordance with said operational unit control indicating information.

10. The debug/trace circuit according to claim 6, wherein said operation indicating information includes performance measurement control indicating information that indicates control of the operation as to measurement, and
said debug/trace circuit further includes a performance measuring portion which controls the operation as to measurement in accordance with said performance measurement control information.

11. An operation observing method for a semiconductor integrated circuit to observe the operation of a main functional structure by a debug/trace circuit built in a semiconductor integrated circuit including a main functional structure that executes continuous predetermined operations to continuously generate events associated with said operations, comprising:
storing beforehand a control information list including a plurality of entries in a sequential manner so as to identify an event which needs an observation based on a series of events, each entry consisting of a set of detection condition indicating information to detect generation of a target event and operation indicating information to designate an operation in accordance with the result of comparison between said detection condition indicating information and the event occurring at said main functional structure; and,
continuously performing in accordance with said control information list, comparison of an event occurring at said main functional structure with the detection condition indicating information of one entry in said control information list, and execution of the operation designated by said operation indicating information paired with said detection condition indicating information in accordance with the result of said comparison, to identify and observe said event.

* * * * *